(12) United States Patent
Saarinen et al.

(10) Patent No.: US 8,898,363 B2
(45) Date of Patent: Nov. 25, 2014

(54) MULTIPLE CONNECTIONS TO A SINGLE SERIAL INTERFACE

(75) Inventors: Pertti Saarinen, Salo (FI); Richard Petrie, Surrey (GB)

(73) Assignee: Nokia Corporation, Espoo (FI)

( * ) Notice: Subject to any disclaimer, the term of this patent is extended or adjusted under 35 U.S.C. 154(b) by 1239 days.

(21) Appl. No.: 12/517,780

(22) PCT Filed: Dec. 8, 2006

(86) PCT No.: PCT/IB2006/054694
§ 371 (c)(1),
(2), (4) Date: Feb. 22, 2010

(87) PCT Pub. No.: WO2008/068552
PCT Pub. Date: Jun. 12, 2008

(65) Prior Publication Data
US 2010/0169534 A1    Jul. 1, 2010

(51) Int. Cl.
*G06F 13/14* (2006.01)
*G06F 1/26* (2006.01)
*G06F 13/38* (2006.01)

(52) U.S. Cl.
CPC .............. *G06F 1/266* (2013.01); *G06F 13/385* (2013.01)
USPC ............................ 710/305; 710/313; 710/316

(58) Field of Classification Search
USPC ................... 710/305, 306, 313, 316; 713/340
See application file for complete search history.

(56) References Cited

U.S. PATENT DOCUMENTS

| | | | |
|---|---|---|---|
| 6,253,329 B1 | 6/2001 | Kang | |
| 6,279,060 B1 | 8/2001 | Luke et al. | |
| 6,516,205 B1 * | 2/2003 | Oguma | 455/557 |
| 6,774,604 B2 * | 8/2004 | Matsuda et al. | 320/110 |
| 6,943,683 B2 | 9/2005 | Perret | |
| 7,185,132 B2 * | 2/2007 | Tang | 710/305 |

(Continued)

FOREIGN PATENT DOCUMENTS

| | | | |
|---|---|---|---|
| EP | 1487081 A | 12/2004 | |
| EP | 1691252 A | 8/2006 | |
| WO | 0148613 A | 7/2001 | |
| WO | 2005112220 A1 | 11/2005 | |

OTHER PUBLICATIONS

Office Action received in corresponding Chinese Application No. 200780050173.2, Dated Dec. 21, 2011, 16 pages.

(Continued)

*Primary Examiner* — Khanh Dang
(74) *Attorney, Agent, or Firm* — Harrington & Smith

(57) ABSTRACT

This invention relates to a method, a computer program product, an apparatus and a system for switching a first switching unit of an apparatus into a state out of a set of states, wherein said apparatus comprises a first serial interface and a second serial interface, each of this first and second serial interfaces comprises at least one data line and a power supply line, and wherein said first switching unit is coupled to the power supply line of both said first serial interface and said second serial interface, wherein said set of states comprises a first state for connecting the power supply of said first serial interface to the power supply of said second serial interface, and a second state for connecting the power supply of said first serial interface to a first further power supply line, said first further power supply line being configured to be connected to a first power supply.

14 Claims, 12 Drawing Sheets

(56) References Cited

U.S. PATENT DOCUMENTS

| | | | |
|---|---|---|---|
| 7,310,697 B2* | 12/2007 | Pandit et al. | 710/313 |
| 7,329,136 B2* | 2/2008 | Su et al. | 439/172 |
| 2002/0154060 A1 | 10/2002 | Smith | |
| 2002/0197963 A1 | 12/2002 | Angermann | |
| 2004/0192227 A1 | 9/2004 | Beach et al. | |
| 2004/0239294 A1* | 12/2004 | Veselic et al. | 320/155 |
| 2005/0136972 A1 | 6/2005 | Smith et al. | |
| 2005/0174094 A1* | 8/2005 | Purdy et al. | 320/134 |
| 2006/0145666 A1* | 7/2006 | Liu | 320/138 |
| 2006/0181241 A1* | 8/2006 | Veselic | 320/107 |
| 2007/0022311 A1* | 1/2007 | Park | 713/310 |
| 2007/0028127 A1* | 2/2007 | Kim | 713/310 |
| 2008/0126594 A1* | 5/2008 | Monks et al. | 710/17 |
| 2008/0140887 A1* | 6/2008 | Gallant et al. | 710/100 |
| 2008/0313477 A1* | 12/2008 | Numano | 713/321 |
| 2010/0169534 A1* | 7/2010 | Saarinen et al. | 710/316 |

OTHER PUBLICATIONS

Universal Serial Bus Specification Rev. 2.0, USB Implementers Forum, Apr. 27, 2000, www.usb.org.

USB On-The-Go Supplement Rev. 1.2 to Universal Serial Bus Specification Rev. 2.0, USB Implementers Forum, Apr. 4, 2006, www.usb.org, 81 pages.

Inter-Chip Universal Serial Bus Supplement Rev. 1.0 to Universal Serial Bus Specification 2.0, USB Implementers Forum, Mar. 13, 2006, 48 pages.

USB Workgroup: "Universal Serial Bust Specification" Sep. 23, 1998, Compaq, Intel, Microsoft, NEC, XP002459839 p. 229-p. 232.

"International Search Report and The Written Opinion of the International Searching Authority", received in corresponding PCT Application No. PCT/IB2006/054694, Dated Dec. 20, 2007, 18 pages.

* cited by examiner

MULTIPLE CONNECTIONS TO A SINGLE SERIAL INTERFACE

RELATED APPLICATION

This application was originally filed as PCT Application No. PCT/IB2006/054694 filed Dec. 8, 2006.

FIELD OF THE INVENTION

This invention relates to a method, an apparatus, a computer program product and a system for a first serial and a second serial interface, e.g. a USB interface.

BACKGROUND OF THE INVENTION

USB is a technology which provides a fast, cabled data connection between a complex device (e.g. a PC) which is called the Host and a connected peripheral (e.g. a mouse, keyboard etc.) which is called the Device.

The USB standard has been extended to include connections between mobile devices in the USB on-The-Go (OTG) supplement. This supplement allows a peripheral at either end of the connection to take a Host or Device role. The initial roles are decided by the direction of the cable connection i.e. the type of plug A or B inserted into the peripheral.

The peripheral with the USB OTG A-plug inserted is called the A-Device, wherein this A-Device supplies power for the duration of the connection and will initially take the host role. The peripheral with the USB OTG B-plug inserted is called the B-Device, wherein the B-Device draws power from the A-Device and initially takes a device role.

Since USB provides the capability to provide power from one device to another it is also possible to make a charger which utilises the USB port. Such a charger is currently defined in the white paper "USB charging white paper", Revision 0.81, Jul. 22, 2006 by the USB implementer's forum. Detection of such a USB charger requires that the charger outputs a logical high on the D– line when the D+ line is pulled high and the D– line is pulled low.

Many peripherals are provided with one single USB connector only. This shows the problem of charging a USB unit, e.g. by means of the above-mentioned charger, and simultaneously providing data passthrough to another USB device via a single USB connector of said USB unit, and thereby not effecting OTG functionalities.

SUMMARY OF THE INVENTION

In view of the above-mentioned problem, it is, inter alia, an object of the present invention to provide a method, a computer program, a computer program product, an apparatus and a system for enabling enhanced simultaneously charging and data passthrough to another apparatus via a single serial connector.

It is proposed an apparatus, comprising a first serial interface and a second serial interface, each comprising at least one data line and a power supply line, a first switching unit coupled to the power supply line of said first serial interface and said second serial interface, wherein in a first state said first switching unit connects the power supply line of said first serial interface to the power supply line of said second serial interface, and wherein in a second state said first switching unit connects the power supply line of said first serial interface to a first further power supply line, said first further power supply line being configured to be connected to a first power supply; and said apparatus comprising a controller configured to control said first switching unit.

Said first serial interface and said second serial interface may be any kind of serial interface which is configured to transfer power by means of the power supply line and which is configured to transfer data via said at least one data line. E.g., said serial interface may represent a USB interface, but it may also represent any other serial interface.

For instance, said apparatus may be connected to a first electronic unit via the first serial interface, and said apparatus may be connected to a second electronic unit via the second serial interface. The first and the second electronic units may be configured to communicate via the at least one data line of the serial interfaces.

In the first state of said first switching unit, the first electronic unit may be charged from the second electronic unit via the connected power supply lines of the first and the second serial interface. In the second state of said first switching unit the first electronic unit may be charged from the first further power supply line of the apparatus. The first further power supply line may be connected to an internal charger placed in the apparatus, wherein said internal charger may be connected to the first power supply, or the first power supply line may be connected to an external charger placed outside the apparatus and connected to the first power supply.

Thus, the apparatus according to the present invention allows simultaneously connecting a first electronic unit to a second electronic unit and simultaneously charging the first electronic unit via one single serial interface connector. The charging may be performed either by the power supply of the apparatus or by the second electronic unit connected to the second interface, which may depend on type of the electronic unit connected to the apparatus.

Thus, increased flexibility is achieved since the first electronic unit may be charged from two different sources. Furthermore, implementation complexity is reduced concerning the first electronic unit, since only one serial interface connector is necessary instead of two connectors for separate and simultaneous charging and providing data transfer to a second electronic unit.

According to an embodiment of the apparatus of the present invention, said first and second serial interfaces are USB interfaces.

Thus, each the first USB interface and the second USB interface may comprise a differential data line, i.e. D+ and D– lines, and the power supply lines may correspond to the VBUS lines.

For instance, said apparatus may be connected to a first USB unit via the first USB interface, and said apparatus may be connected to a second USB unit via the second USB interface. The first and the second USB units may communicate via the D+ and D– lines, wherein the D+ pin of the first interface may be connected to the D+ pin of the second interface, and wherein the D– pin of the first interface may be connected to the D– pin of the second interface.

In the first state of said first switching unit, the first USB unit may be charged from the second USB unit, e.g. in case the first USB unit represents a USB OTG B-Device and the second USB represents a USB OTG A-Device like a Host-Charger, or, vice versa, the first USB unit may charge the second USB unit, e.g. in case the first USB unit represents a USB OTG A-Device and the second USB unit represents a USB OTG B-Device. In the second state of said first switching unit the first USB unit may be charged from the first power supply line of the apparatus. The first power supply line may be connected to an internal charger placed in the apparatus, wherein said internal charger may be connected to the first power supply, or the first power supply line may be connected to an external charger placed outside the apparatus and connected to the first power supply.

Thus, the apparatus according to the present invention allows simultaneously connecting a first USB unit to a second USB unit and simultaneously charging the first USB unit via one single USB connector. The charging may be performed either by the power supply of the apparatus or by the second USB unit connected to the second interface, which may depend on type of USB units connected to the apparatus. For instance, USB charging during any application data transfer may be performed via a single USB connector of the first USB unit.

Thus, increased flexibility is achieved since the first USB unit may be charged from two different sources. Furthermore, implementation complexity is reduced concerning the first USB unit, since only one USB connector is necessary instead of two USB connectors for separate charging and connecting to a second USB unit.

According to an embodiment of the apparatus of the present invention, said apparatus comprises an interface for connecting the first further power supply line to the first power supply.

For instance, a main supply may be connected to the apparatus via said connector in order to provide said first further power supply line with power. Said main supply may comprise or may represent said first power supply.

Alternatively, a charger may be connected to the apparatus via said connector. E.g., in case the serial interfaces represent USB interfaces, a USB-charger may be connected to the apparatus via said connector. In this case, the USB-charger has a mains connector, a transforming means to generate the specified VBUS voltage (e.g. 5 V), a cable and a USB connector to supply the VBUS voltage to a USB device for charging. Thus, said connector of the apparatus is a USB connector. This embodiment has the advantage, that the supplied voltage doesn't need to be transformed inside the apparatus, as it already provides the right voltage level.

According to an embodiment of the apparatus of the present invention, the controller switches the first switching unit into the second state if said first further power supply line is connected to the first power supply.

Thus, when the apparatus is provided with power from the first power supply, then a first electronic unit, e.g. a USB unit, connected to the first interface may be charged by the connected first power supply. For the case that a charger or a Host-charger is connected as second electronic unit to the second interface, then the controller may optionally switch the first switching unit into the first state in order to charge the first electronic unit by the connected charger or Host-charger.

According to an embodiment of the apparatus of the present invention, said apparatus comprises a charger identification unit configured to detect a charger connected to the second serial interface, and wherein said controller switches said first switching unit into the first state if a charger is detected at the second serial interface.

Said charger identification may depend on the type of serial interface.

For instance, in case the first and second serial interfaces represents USB interfaces, the said charger identification may be performed by detecting the levels of the D+ and D− pins of the second interface, e.g. a charger may be indicated by D+ high and D− low, and, for instance, by the voltage of the VBUS of the second interface.

According to an embodiment of the apparatus of the present invention, said apparatus comprises a second switching unit coupled to at least one data line of said at least one data line of said first serial interface and coupled to at least one data line of said at least one data line of second serial interface, respectively, and wherein in a first state said second switching unit connects said at least one data line of said at least one data line of said first serial interface to the corresponding at least one data line of said at least one data line of said second serial interface, respectively, and wherein in a second state said second switching unit disables data passthrough from the first to the second serial interface.

Thus, in said first state data passthrough between said first serial interface and said second serial interface is enabled.

According to an embodiment of the apparatus of the present invention, said first and second serial interfaces are USB interfaces, and said power supply lines of said first and second USB interfaces represent VBUS power supply lines, wherein said second switching unit is coupled to the D+ and D− pins of the first and second USB interfaces, respectively, wherein in said first state said second switching unit connects the D+ pins of the first and second USB interfaces to each other and connects the D− pins of the first and second USB interfaces to each other.

Thus, in said first state data passthrough between said first USB interface and said second USB interface is enabled. For instance, in the second state the D+ and D− pins of the first interface and/or the D+ and D− pins of the second interface may be shortened, wherein a shortened D+ and D− pin at an interface indicates a charger according to the USB OTG rules. Thus, this second state may be also used in order to indicate a charger at the first interface and/or at the second interface.

According to an embodiment of the apparatus of the present invention, in a first sub-state of said second state said second switching unit shorts the D+ and D− pins of the first USB interface together in order to indicate a charger, and said second switching unit is switched into said first sub-state if a charger is detected at the second USB interface.

For instance, the short may be carried out by switching an impedance between the respective D+ and D− pins of the first USB interface. Thus, RF interference may be reduced or eliminated. Furthermore, other filter means like electrostatic dischargers may be applied in order to decrease RF interference which could interfere the apparatus.

According to an embodiment of the apparatus of the present invention, said apparatus is configured to communicate via the ID pin of the first USB interface.

For instance, in order to provide full OTG functionality the apparatus should be able to communicate with a connected first USB unit via the first interface. According to the USB standard, the ID pin of a B-plug is floating and the ID pin of an A-plug is connected to ground. Thus, it is possible to use the ID-pin of the first interface for data communication to a compatible USB unit, e.g. by connecting a 5 wire cable to the first interface having a USB B-plug at its end suited for connecting to a USB receptacle of a USB unit. For this communication via the ID-pin of the first interface the apparatus may comprise a communication unit, which may be connected to the controller. Any suited link system may be used for this communication to the connected USB unit.

Furthermore, for instance, the apparatus may be configured to transmit and/or receive a Radio Frequency (RF) signal via the ID pin of the first USB interface. This may be used for instance to bypass an FM-antenna signal from an accessory to a USB unit connected to the first USB interface via the apparatus.

According to an embodiment of the apparatus of the present invention, said communication via the ID pin is performed by a dual impedance Enhancement Control Interface (ECI) link interrupt.

According to an embodiment of the apparatus of the present invention, when a USB unit is connected to the first USB interface, said apparatus switches the second switching unit into the first state, if said USB unit is suited to communicate to the apparatus via the ID pin of the first USB interface and no charger is detected at the second USB interface, and wherein said apparatus switches the second switching unit into the second state if said USB unit is not suited to communicate to the apparatus via the ID pin of the first USB interface.

Thus, data transfer through the apparatus may only be provided if the apparatus and the USB unit connected to the first interface can communicate to each other. Otherwise, the apparatus may only provide limited functionality e.g. charging only.

According to an embodiment of the apparatus of the present invention, in case an USB OTG B-Device is connected to the second USB interface, the controller switches the first switching unit into a first sub-state of the second state, wherein in said first sub-state the first switching unit connects the VBUS of the first USB interface to the first further power supply line and connects the VBUS of the second USB interface to a second further power supply line.

This second further power supply line may be connected to a separate second power supply in order to provide a second USB unit connected to the second interface with power. This second further power supply may also be connected to the connector of the apparatus, if this second further power supply may represent an internal power supply which may be powered from the first power supply.

According to an embodiment of the apparatus of the present invention, in case an USB OTG B-Device is connected to the second USB interface, and in case that said USB unit connected to the first USB interface is suited to communicate to the apparatus via the ID pin of the first USB interface, then the apparatus signals to the USB unit via the ID pin to switch into a host role.

Thus, the full USB OTG functionality is provided, since the USB OTG B-Device connected to the second interface needs an A-Device as antagonist, i.e. a Host-Device. Hence, the communication via the ID pin ensures OTG functionality.

According to an embodiment of the apparatus of the present invention, in case an USB OTG A-Device is connected to the second USB interface, and said USB unit connected to the first USB interface is suited to communicate to the apparatus via the ID pin of the first USB interface, then the apparatus signals to the USB unit via the ID pin to switch into a peripheral role.

Thus, the full USB OTG functionality is provided, since the USB OTG A-Device connected to the second interface needs an B-Device as antagonist, i.e. a Peripheral-Device. Hence, the communication via the ID pin ensures OTG functionality.

According to an embodiment of the apparatus of the present invention, said apparatus comprises a leakage switch circuit connected to the VBUS of the second USB interface, wherein said leakage switch circuit is configured to be switched into a state for compensating the VBUS load according to the VBUS load range of the USB OTG standard.

Thus, the VBUS impedance and power consumption values as defined in the standard and OTG supplement can be met by the VBUS.

According to an embodiment of the apparatus of the present invention, in case that said USB unit connected to the first USB interface is suited to communicate to the apparatus via the ID pin of the first USB interface, and in case that during operation said first power supply is removed from the apparatus, then the controller switches the first switching unit into the first state, and then in case an USB OTG B-Device is connected to the second USB, the USB unit is signalled via the ID pin to turn on its power supply.

In case that the first power supply is removed during operation, e.g. by being disconnected from the apparatus connector, then the first switching unit is switched into the first state in order to connect the VBUS of the first interface to the VBUS of the second interface. In case that the second USB unit is an OTG A-Device, then power supply to the first USB unit connected to the first interface is provided by the A-Device, and in case that the second USB unit is no OTG A-Device, then the first USB unit which is connected to the first interface is signaled via the communication unit to turn on its power supply in order to provide the second USB unit connected to the second interface with power.

Thus, power supply can be ensured even when the first power supply is removed.

According to an embodiment of the apparatus of the present invention, in case that said USB unit connected to the first USB interface is suited to communicate to the apparatus via the ID pin of the first USB interface, and in case that during operation said first power supply is connected to the apparatus, then the controller switches the first switching unit into the second state, and in case an USB OTG B-Device is connected to the second USB, the USB unit is signalled via the ID pin to turn off its power supply.

In case it is detected that a removed first power supply is connected to the apparatus during operation, then the first switching unit is switched in to the second state, and, if the second USB unit is not an OTG A-Device, then the first USB unit which is connected to the first interface is signaled via the communication unit to turn off its power supply.

According to an embodiment of the apparatus of the present invention, said apparatus is configured to be switched into a dual charge mode, wherein the first switching unit is switched into a first sub-state of the second state, and wherein in said first sub-state the first switching unit connects the VBUS of the first USB interface to the first further power supply line and connects the VBUS of the second USB interface to a second further power supply line, and wherein said second switching unit is switched into a second sub-state of the second state, wherein in said second sub-state said second switching unit shorts both the D+ and D− pins of the first USB interface and of the second USB interface together in order to indicate a charger.

For instance, in this first sub-state of the second state, the first further power supply line may connect the VBUS of the first interface to an first charger in order to charge the USB unit connected to the first interface, and the VBUS of the second interface is connected to the second further power supply line, wherein said second further power supply line may be provided by a second charger or, alternatively, also by the first charger.

According to an embodiment of the apparatus of the present invention, said first interface represents a USB Micro-B plug.

According to a USB Micro-B plug, the ID pin is floating and thus can be used for the communication to a connected USB unit as mentioned above. For instance, the Micro-B plug may be placed at the end of a 5-wire cable which is connected to the apparatus.

According to an embodiment of the apparatus of the present invention, said second interface represents a USB Micro-AB receptacle.

Thus, any USB Micro-plug can be connected to the Micro-AB receptacle. According to the OTG rules, via the communication link over the ID pin of the first interface a compatible USB unit connected to the first interface can be signalled to take the host or device role accordingly.

Furthermore, a method is proposed, said method comprises switching a first switching unit of an apparatus into a state out of a set of states, wherein said apparatus comprises a first serial interface and a second serial interface, each of said first and second serial interfaces comprising at least one data line and a power supply line, and wherein said first switching unit is coupled to the power supply line of both said first serial interface and said second serial interface; wherein said set of states comprises a first state for connecting the power supply line of said first serial interface to the power supply line of said second serial interface, and a second state for connecting the power supply line of said first serial interface to a first further power supply line, said first further power supply line being configured to be connected to a first power supply.

The explanations concerning the embodiments of the proposed apparatus also hold for the proposed method.

Furthermore, a computer program product is proposed, in which a computer program code is stored in a computer readable medium, which computer program codes realizes the method proposed above.

Further, a computer-readable medium having a computer program stored thereon is proposed, the computer program comprising instructions operable to cause a processor to perform the method proposed above.

Furthermore, an apparatus is proposed, said apparatus comprising a first serial interface means and second serial interface means, each of said first and second serial interfaces comprising at least one data line and a power supply line, said apparatus further comprising a first means for switching coupled to the power supply line of said first serial interface means and said second serial interface means, wherein in a first state said first means for switching connects the power supply line of said first serial interface means to the power supply line of said second serial interface means, and wherein in a second state said first means for switching connects the power supply line of said first serial interface to a first further power supply line, said first further power supply line being configured to be connected to a first power supply; and said apparatus comprising means for controlling configured to control said first means for switching.

Finally, a system is proposed, said system comprising said apparatus proposed above, and an electronic unit suited to be connected to the first serial interface.

For instance, said electronic unit suited to be connected to the first serial interface may represent a mobile phone, or a handheld device.

According to an embodiment of said system of the present invention, said first and second serial interfaces are USB interfaces, and said electronic unit is a USB unit.

According to an embodiment of said system of the present invention, said USB unit is configured to communicate to the apparatus via the ID pin of the first USB interface.

For instance, said USB unit may be configured to detect the connected apparatus by means of the communication via the ID pin of the first USB interface, and it may communicate a positive result of said detection to the apparatus via the communication. E.g., in case the above-mentioned ECI link interrupt is used for the communication via the ID pin, then in case of a positive result of said detection the USB unit may allow the apparatus to use low impedance interrupt via the ID pin. This permission may guarantee compatibility, and it may guarantee that not prepared USB units connected to the first USB interface will not be commanded erroneously.

These and other aspects of the invention will be apparent from and elucidated with reference to the embodiments described hereinafter.

DETAILED DESCRIPTION OF THE INVENTION

Figure 1A:
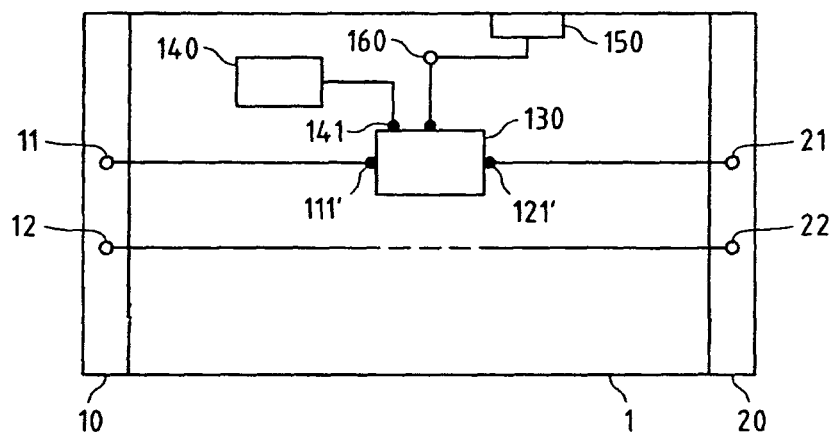
FIG. 1a: a block diagram of a first exemplary embodiment of an apparatus according to the present invention.

FIG. 1a depicts a block diagram of a first exemplary embodiment of an apparatus 1 according to the present invention. The apparatus comprises a first serial interface 10, a second serial interface 20, and a first switching unit 130 coupled to a power supply line 11 of the first serial interface 10 and coupled to the power supply line 21 of the second serial interface 20. Said first serial interface 10 comprises at least one data line 12, and said second serial interface 20 comprises at least one data line 22. Said first switching unit 130 is configured to connect the power supply line 11, 111' of said first serial interface 10 to the power supply line 21, 121' of said second serial interface 20 in a first state, and said first switching unit 130 is configured to connect the power supply line 11 of said first serial interface 10 to a first further power supply line 160 in a second state, wherein said first further power supply line 160 is configured to be connected to a first power supply, e.g. by connector 150. The apparatus 1 further comprises a controller 140 configured to control said first switching unit 130.

For instance, said apparatus 1 may be connected to a first electronic unit via the first serial interface 10, and said apparatus 1 may be connected to a second electronic unit via the second serial interface 20. As depicted exemplarily in FIG. 1a, the first and the second electronic units may communicate via the at least one data lines 12, 22, of the first and the second interface 10, 20, wherein each of the at least one data line 12 of the first serial interface 10 may be connected to the corresponding data line of the at least one data line 22 of the second serial interface 20. For instance, the apparatus 1 may comprise a second switching unit (not shown in FIGS. 1a and 1b) for switching the data lines.

Furthermore, in the first state of said first switching unit 130 the first electronic unit may be charged from the second electronic unit, e.g. in case the second electronic unit represents an electronic device configured to provide power, or, vice versa, the first electronic unit may charge the second electronic unit, e.g. in case the first electronic unit represents an electronic device configured to provide power. In the second state of said first switching unit the first electronic unit may be charged from the first further power supply line 160 of the apparatus 1. For instance, the apparatus may contain an internal charger (not shown in FIG. 1a) placed between the connector 150 and the first further power supply line 160.

Figure 1B:
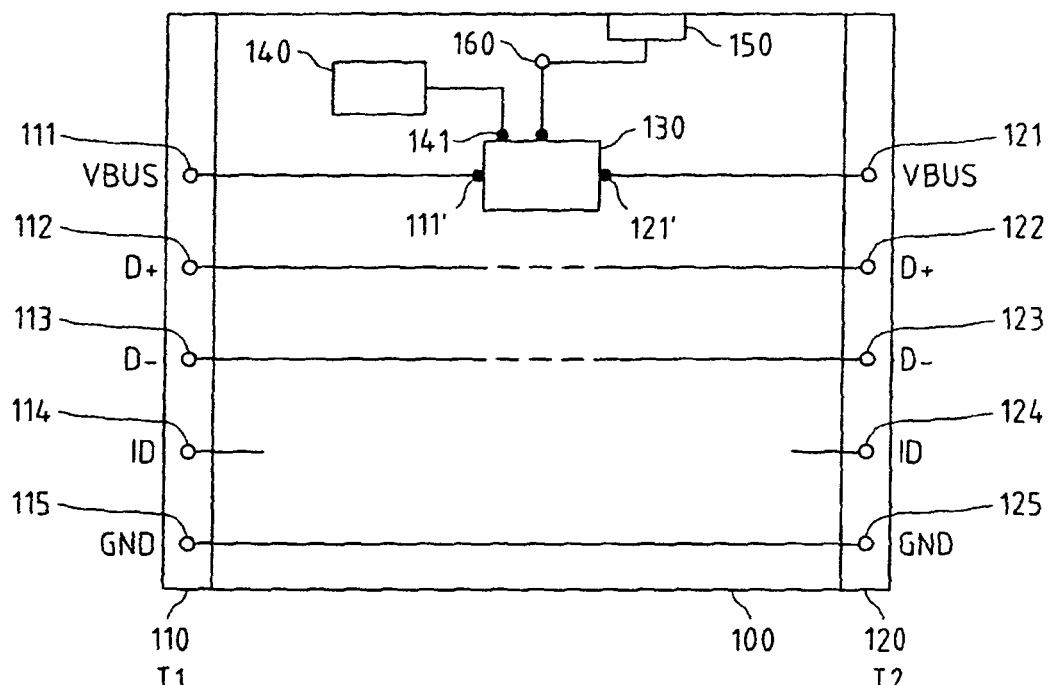
FIG. 1b: a block diagram of a second exemplary embodiment of an apparatus according to the present invention.

FIG. 1b depicts a block diagram of a second exemplary embodiment of an apparatus 100 according to the present invention, wherein this second exemplary embodiment is based on the first embodiment, and wherein the first serial interface 10, 110 represents an USB interface 110 (I1) and the second serial interface 20, 120 represents an USB interface 120 (I2). Thus, the explanations regarding the first exemplary embodiment also hold for this second exemplary embodiment. The following exemplary embodiments are not restricted to the use of USB interfaces as serial interfaces exclusively, the USB interfaces 110, 120 may also be replaced by other suited interfaces.

The apparatus 100 comprises a first USB interface 110 (I1), a second USB interface 120 (I2), and the first switching unit 130 coupled to the VBUS 111 of the first USB interface 110 and coupled to the VBUS 121 of the second USB interface 120. Said first switching unit 130 is configured to connect the VBUS 111 (i.e. the power supply line) of said first USB interface 110 to the VBUS 121 (i.e. the power supply line) of said second USB interface 120 in a first state, and said first switching unit 130 is configured to connect the VBUS 111 of said first USB interface 110 to a first further power supply line 160, wherein said first further power supply line 160 is configured to be connected to a first power supply, e.g. by connector 150. The apparatus 100 further comprises the controller 140 configured to control said first switching unit 130.

For instance, said apparatus 100 may be connected to a first USB unit via the first USB interface 110, and said apparatus 100 may be connected to a second USB unit via the second USB interface 120. As depicted exemplarily in FIG. 1b, the first and the second USB units may communicate via the D+ and D− lines which are connected to the respective D+ pins 112, 122 and D− pins 113, 123 of the first and the second interface 110, 120. Furthermore, in the first state of said first switching unit 130 the first USB unit may be charged from the second USB unit, e.g. in case the first USB unit represents a USB OTG B-Device and the second USB unit represents a USB OTG A-Device like a Host-Charger, or, vice versa, the first USB unit may charge the second USB unit, e.g. in case the first USB unit represents a USB OTG A-Device and the second USB represents a USB OTG B-Device. In the second state of said first switching unit the first USB unit may be charged from the first further power supply line 160 of the apparatus 100. For instance, the apparatus may contain an internal charger (not shown in FIG. 1) placed between the connector 150 and the first further power supply line 160.

Thus, the apparatus 100 according to the present invention allows simultaneously connecting a first USB unit to a second USB unit and simultaneously charging the first USB unit via one single USB connector. The charging may be performed either by the internal power supply of the apparatus 100 or by the second USB unit connected to the second interface 120, which may depend on type of USB units connected to the apparatus 100. For instance, USB charging during any application data transfer may be performed via a single USB connector of the first USB unit.

The explanations and advantages concerning these first and second exemplary embodiments of an apparatus 1, 100 according to the present invention also hold for the succeeding exemplary embodiments. In the sequel, the at least one data line 12 of the first serial interface 10 corresponds to the D+ pin 112 and D− pin 113 of the first USB interface 110, and the power supply line 11 of the first serial interface 10 corresponds to the VBUS pin 111 of the first USB interface 110. With respect to the second serial interface 20 and the second USB interface 120, the at least one data line 22 corresponds to the D+ pin 122 and D− pin 123 of the second USB interface 120, and the power supply line 21 corresponds to the VBUS pin 121 of the second USB interface 120.

Figure 1C:
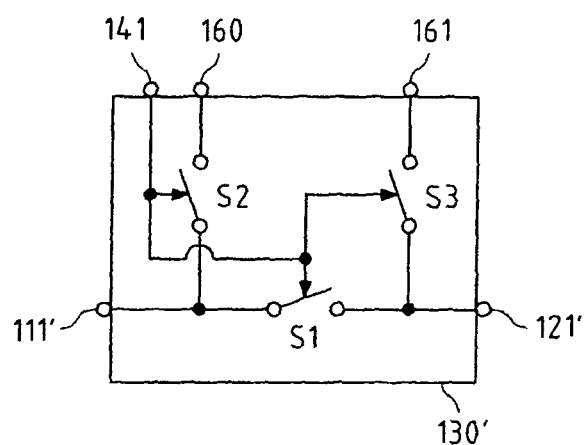
FIG. 1c: a block diagram of an exemplary embodiment of a first switching unit of an apparatus according to the present invention.

A block diagram of an exemplary embodiment of said first switching unit 130 of an apparatus 1, 100 according to the present invention is depicted in FIG. 1c. This exemplary first switching unit 130' comprises three switches S1, S2, S3, wherein the third switch S3 is optional. During the first state of said first switching unit 130' the first switch S1 is closed and thus VBUS 111' of the first interface 110 is connected to the VBUS 121' of the second interface 120, and the second switch S2 and the optional third switch S3 may be open. In the second state of said first switching unit 130' the second switch S2 is closed in order to connect the first further power supply line 160 to the VBUS 111' of the first interface 110, the first switch S1 may be open. Furthermore, the optional switch S3 may be closed in order to connect the VBUS 121' of the second interface 120 to the optional second further power supply line 161. This optional second further power supply line may be connected to the connector 150 depicted in FIGS. 1a, 1b, e.g. to a separate second power supply in order to provide a second USB unit connected to the second interface 120 with power. For instance, the first further power supply line 160 may be connected to an internal charger which is configured to be connected to the first power supply in order to charge a first USB unit connected to the first interface 110. These three switches S1, S2, S3 in Π-array provide full OTG replication. Via connector 141 the switches S1, S2, S3 can be connected to the controller 140.

The first switching unit 130 may be controlled in such a way that in case one of the vertical switches S2, S3 is closed the horizontal switch S1 must be open. This may be controlled via a controller, e.g. controller 140 depicted in FIGS. 1a, 1b, connected to connector 160. For instance, the first switching unit 130 may also comprise a HW unit, e.g. HW gates, to guarantee that no erroneous state is possible under potential SW crash.

Figure 2:
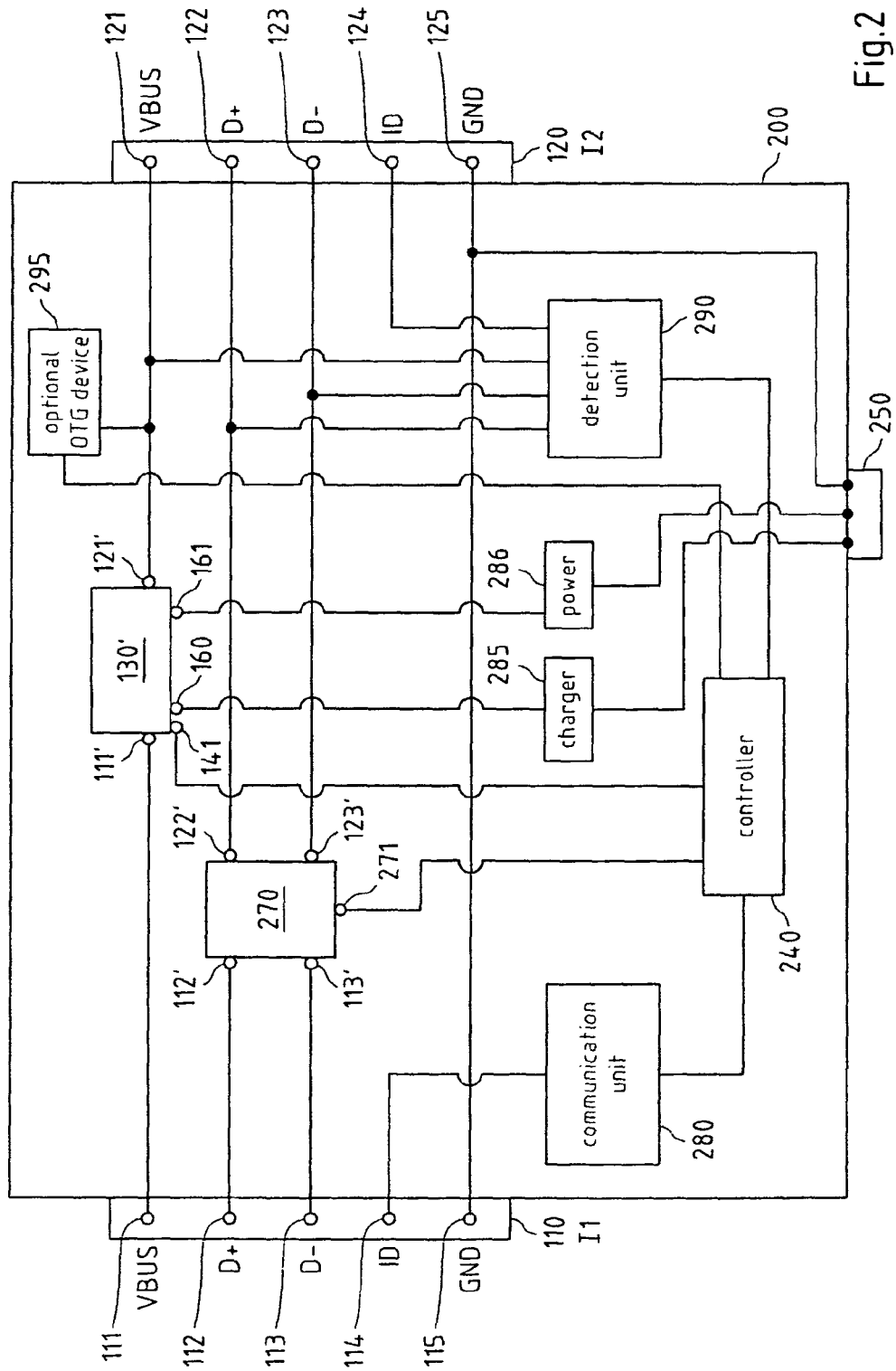
FIG. 2: a block diagram of a third exemplary embodiment of an apparatus according to the present invention.

FIG. 2 depicts a block diagram of a third exemplary embodiment of an apparatus 200 according to the present invention, wherein the apparatus may comprise the exemplary embodiment of said first switching unit 130' as depicted in FIG. 1c. The first further power supply line 160 is connected to an internal charger 285, and the second further power supply line 161 is connected to an internal power unit 286, wherein both the internal charger 285 and the inter power unit 286 are connected to the connector 250. The switches S1, S2, S3 of the first switching unit 130' are controlled by the controller 240 via connector 141.

The apparatus 200 further comprises a second switching unit 270 coupled to the D+ pins 112, 122 and D− pins 113, 123 of the first and second interface 110, 120, respectively, wherein in a first state said second switching unit connects the D+ pins 112, 122 of the first and second USB interfaces 110, 120 to each other and connects the D− pins 113, 123 of the first and second USB interfaces 110, 120 to each other, and wherein in a second state said second switching unit disables data passthrough from the first USB interface 110 to the second USB interface 120.

Figure 3A:
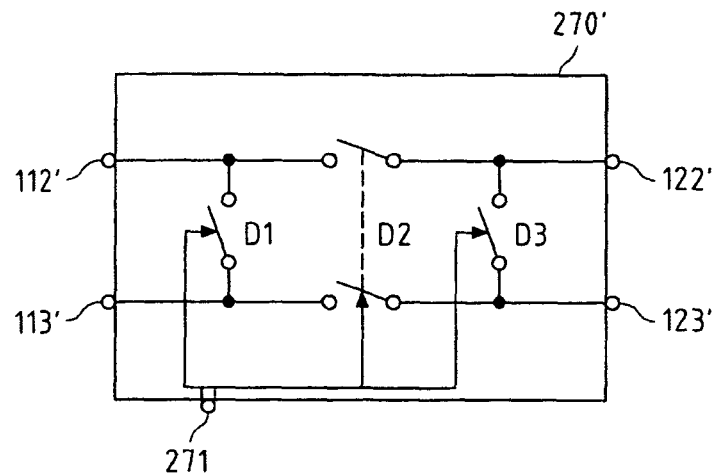
FIG. 3a: a block diagram of a first exemplary embodiment of a second switching unit of an apparatus according to the present invention.

FIG. 3a depicts a block diagram of a first exemplary embodiment of said second switching unit 270' of an apparatus 200 according to the present invention, wherein said second switching unit 270' comprises three switches D1, D2, D3, each of them connected to connector 271 in order to be controlled by a controller, e.g. by controller 240. In said first state of the second switching unit 270' the switches D1 and D3 may be opened and double-switch D2 may be closed, whereas in said second state switches D1 and D3 may be closed and double-switch D2 may be opened so that data passthrough is disabled. Furthermore, the short between the D+ and D− pins in this second state indicates a charger.

Figure 3B:
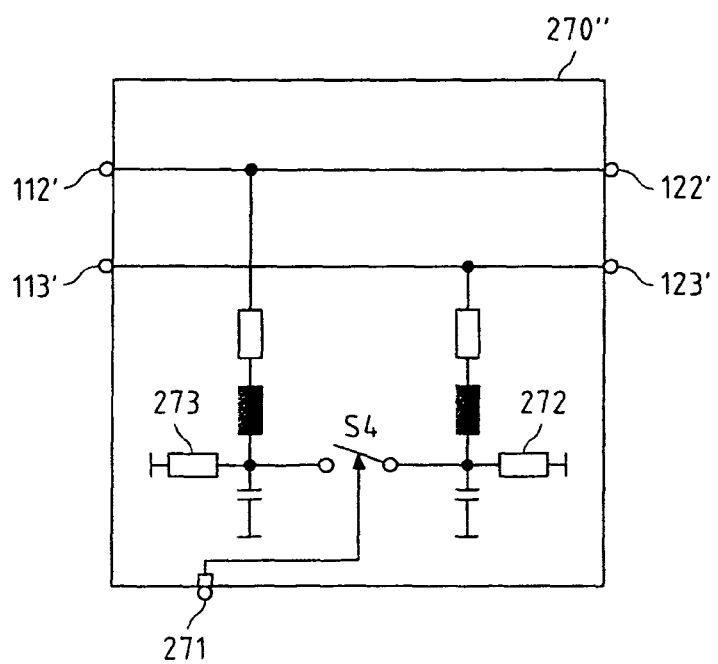
FIG. 3b: a block diagram of a second exemplary embodiment of a second switching unit of an apparatus according to the present invention.

FIG. 3b depicts a block diagram of a second exemplary embodiment of a second switching unit 270" of an apparatus 200 according to the present invention, wherein said second switching unit 270' comprises a switch S4 connected to connector 271 in order to be controlled by a controller, e.g. by controller 240. In said first state of the second switching unit 270" the switch S4 is opened in order to allow data passthrough, and in the second state the switch S4 is closed so that data passthrough is disabled. Furthermore, the short between the D+ and D− pins in this second state indicates a charger. The impedances connected to the D+ and D− line may have a DC-impedance of 500-1000Ω, thus a charger detection system interprets D+ and D− still to be shortened, and these impedances, possible resistors and other possible filtering elements depicted in FIG. 3b, e.g. electrostatic discharge elements 272, 273, may be used in order that the charger signaling system do not have adverse effect to the USB RF-performance.

In order to provide full functionality of the apparatus 200, a USB unit connected to the first interface 110 should enable communication to the apparatus 200, e.g. for signaling to the connected USB unit. This communication may be performed via the ID pin 114 of the first interface 110. According to the USB standard, the ID pin of a B-plug is floating and the ID pin of an A-plug is connected to ground. Thus, it is possible to use the ID-pin 114 of the first interface 110 for data communication to a compatible USB unit, e.g. by connecting a 5 wire cable to the first interface 110 having a USB B-plug at its end suited for connecting to a USB receptacle of a USB unit. For this communication via the ID-pin 114 of the first interface 110 the apparatus may comprise a communication unit 280, which may be connected to the controller 240. A possible communication via the ID-pin 114 may be performed by an Enhancement Control Interface (ECI) link, as exemplary depicted in FIGS. 4 and 5. Details will be explained in the explanation of the corresponding embodiments related to FIGS. 4 and 5, wherein these details may also hold for the communication unit 280 depicted in FIG. 2.

Furthermore, for instance, the apparatus 200 may be configured to transmit and/or receive a Radio Frequency (RF) signal via the ID pin 114 of the first USB interface 110. This may be used for instance to bypass an FM-antenna signal from an accessory to a USB unit connected to the first USB interface 100 via the apparatus 200. For instance, the ID pin 124 of the second USB interface 120 may be connected to the ID pin 114 of the first USB interface by means of an ID line, and said FM-antenna signal may be transmitted from a connected accessory via the ID pin 124 of the second USB interface 120 through an apparatus' ID line to the ID pin 114 of the first USB interface 110. E.g., the communication unit 280 and/or the detection unit 290 may be connected by means of a lowpass unit to said ID line so that a RF signal on the ID line does not interfere the communication unit 280 and/or the detection unit 290. Said lowpass unit may comprise at least one coil.

Figure 9A:
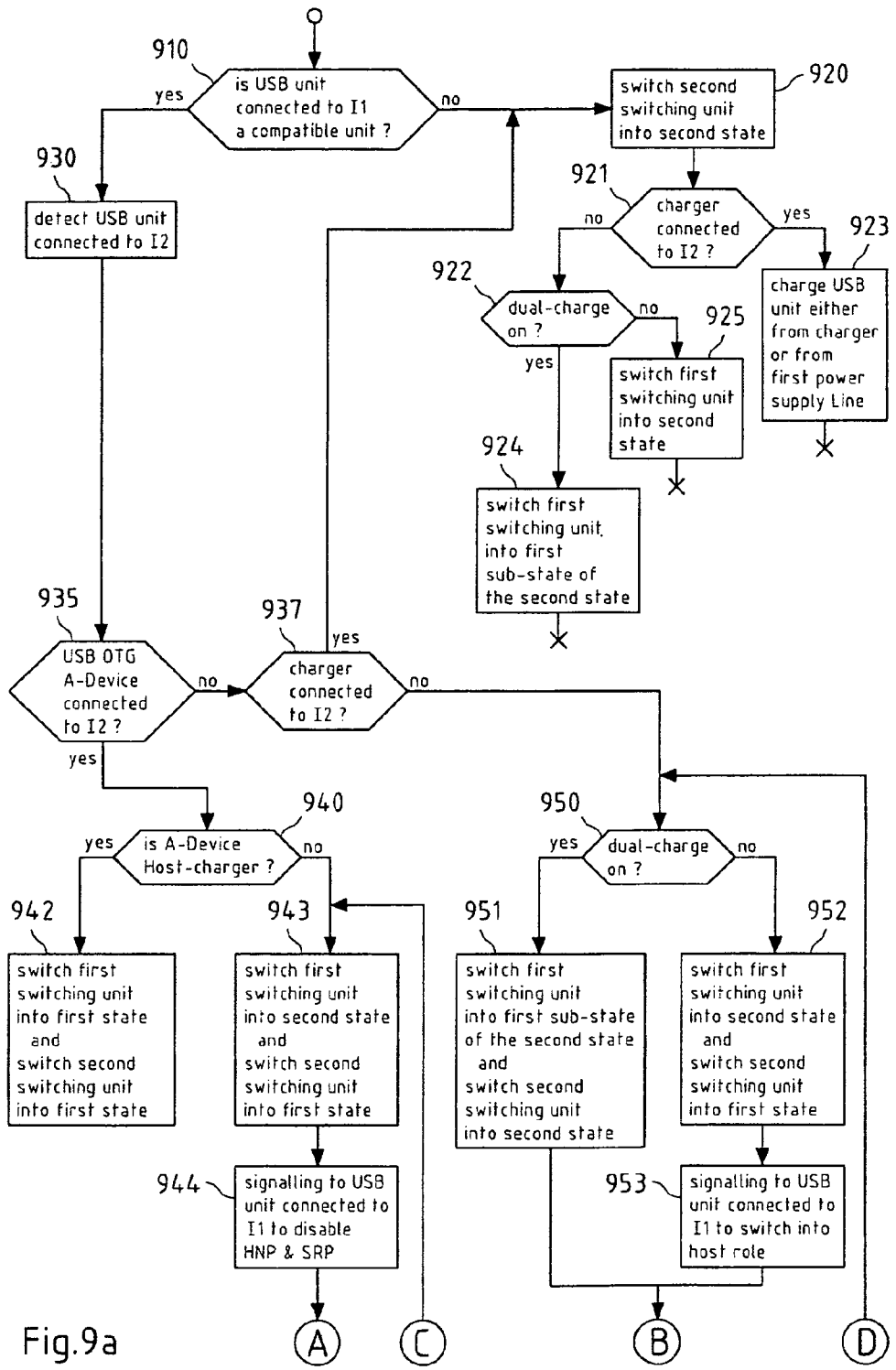
FIGS. 9a/9b: a flowchart of an exemplary embodiment method according to the present invention.

In the sequel, the functions of the apparatus 200 will be explained by reference to flowchart of an exemplary embodiment of a method according to the present invention depicted in FIGS. 9a/9b.

At first, the apparatus may determine whether a USB unit connected to the first interface 110 (I1) is a compatible unit, i.e. a USB unit configured to communicate to the apparatus 200 via the ID-pin 114 of the first interface 110. This determining (step 910) may be performed by the communication unit 280. In case that a USB unit connected to the first interface 110 provides no communication to the apparatus 200, i.e. represents a non-compatible USB unit, then the apparatus 200 may only provide limited functionality e.g. charging only, so that the second switching unit 270, 270', 270" may be switched into the second state (step 920). Thus, no data communication via the D+ and D− lines is possible and the apparatus 200 signals a charger via the D+ and D− lines. The apparatus may detect whether a charger is connected to the second interface, e.g. by means of the detection unit 290, wherein the charger may be detected by D+ 122 high and D− 123 low and VBUS 121 supply. This detection may be performed before the second switch is switched into the second state (step 920). In case a charger is connected to the second interface 120 (step 921), then the USB unit connected to the first interface 110 may by charged from the connected charger, i.e. the controller 240 switches the first switching unit 130' into the first state (steps 921 and 923), or the USB unit connected to the first interface 110 may be charged from the first further power supply line 160, i.e. the controller 240 switches the first switching unit 130' into the second state (steps 921 and 923). If no charger is connected to the second interface 120 (I2) (step 921), then the controller 240 may directly switch the first switching unit 130' into the second state (if the optional dual-charge mode is not implemented), or, in case that a dual-charge mode exists, then it is determined in step 922 whether dual-charge is activated, and if this the case, then the first switching unit switches into a first sub-state of the second state (step 924). In this first sub-state of the second state, the first further power supply line 160 may connect the VBUS 111 of the first interface 110 to the charger 285 in order to charge the USB unit connected to the first interface 110, and the VBUS 121 of the second interface 120 is connected to the second further power supply line 161, so that the USB unit connected to the second USB interface may be charged via the power unit 286, which may be switched to a charger functionality in the dual-charge mode. If no dual-charge is activated, then the first switching unit 130' is switched into the second state at step 925. Activating the dual-charge mode may be performed by a dual-charge button, which shows the advantage of low-cost implementation and good user comfort, or it may be activated by the controller 240, e.g. based on software control, which introduces no further hardware costs.

If the USB unit connected to the first interface 110 is detected as compatible unit (step 910), then the apparatus 200 may provide full functionality. Then, a second USB unit connected to the second interface 120 may be detected by the detection unit 290 (step 930).

Then it may be checked whether the second USB unit is an USB OTG A-Device (step 935). If the second USB unit is an A-Device, and if this A-Device represents a Host-Charger (step 940), then the first switching unit 130' is switched into the first state and the second switching unit 270 is switched into the first state (step 942). In case the second USB unit is an A-Device but no Host-charger, then (step 943) the first switching unit is switched into the second state in order to charge the first USB unit via the first interface 110 and the second switching unit is switched into the first state in order to allow data passthrough via the first interface 110 and the second interface 120. Furthermore, the apparatus may signal to the first USB unit connected to the first interface 110 to disable HNP&SRP by means of the communication unit via the ID-pin 114 of the first interface 110 (step 944).

In case that no USB OTG A-Device is connected to the second interface 120 (step 935), then it may be checked whether a charger is connected to the second USB interface (step 937), e.g. indicated by D+ 122 high and D− 123 low, and in case a charger is detected then the method may proceed at step 920 or may directly jump to step 923.

If no charger is detected to be connected to the second interface 120 (step 937), and if the optional dual-charge mode is implemented, it is first checked whether dual-charge is on (step 950), and if the dual-charge is activated then (step 951) the first switching unit is switched into the first sub-state of the second state and the second switching unit is switched into the second state in order to indicate a USB charger. Otherwise, if dual-charge is not on or if the optional dual-charge-mode is not implemented, then the first switching unit 130' is switched into the second state in order to charge the first USB unit via the first interface 110 and the second switching unit 270 is switched into the first state in order to provide data passthrough (step 952), and the apparatus may signal to the first USB unit connected to the first interface 110 to switch into a host, e.g. if a USB-OTG B-Device is detected to be connected to the second interface.

Furthermore, in case that the first power supply is removed during operation, e.g. by being disconnected from connector 250, which may be detected in steps 945 or 954, respectively, then the first switching unit is switched into the first state (steps 946 and 955) in order to connect the VBUS 111 of the first interface 110 to the VBUS 121 of the second interface. In case that the second USB unit is an OTG A-Device, then power supply to the first USB unit connected to the first interface 110 is provided by the A-Device (step 946, 955), and in case that the second USB unit is no OTG A-Device, then the first USB unit which is connected to the first interface 110 is signaled via the communication unit 280 to turn on its power supply in order to provide the second USB unit connected to the second interface 120 with power.

Further, if it is detected that a removed first power supply is connected to the apparatus 200 during operation (steps 947, step 957), then the first switching unit 130' is switched in to the second state (steps 948 and 958), and, if the second USB unit is not an OTG A-Device, then the first USB unit which is connected to the first interface 110 is signaled via the communication unit 280 to turn off its power supply (step 959).

Optionally, the apparatus 200 may further comprise an additional switch configured to switch the controller 240 to the VBUS 111, 121 of the first or second USB interface 110, 120, so that in case the first power supply is removed during operation (steps 945, 954), then this additional switch may connect the controller 240 to the VBUS in order to get power.

In case that the first power supply provides the apparatus 200 with power, then this additional switch is open and thus power is not taken to control unit 240 from the external VBUS in order to prevent to take too much current from the external VBUS. Thus, extra robustness may be guaranteed in case of power interrupts.

Furthermore, any one-time OTG detection, e.g. at step 930, may be done by multiplexing. This expects, that charging is interrupted for a short period and resumed after detection of VBUS is completed.

Figure 9B:
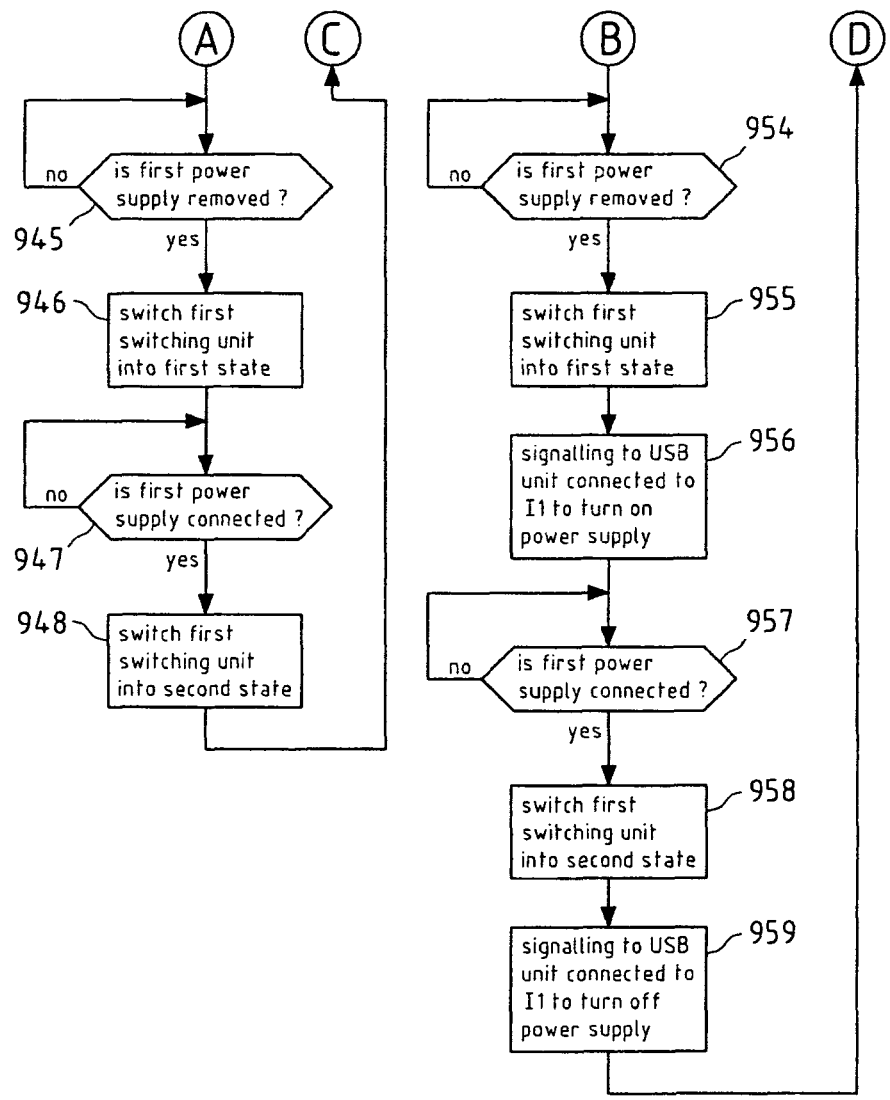

Additionally, the apparatus 200 may further be configured to detect a disconnection of the first USB unit from the first USB interface 110 (not shown in FIGS. 9a and 9b), and in case that a disconnection is detected, then the apparatus 200 may immediately reset and may jump to step 910 in order to wait for the connection of an USB unit to the first USB interface 100. Said detection of a disconnection may be performed via the ID-pin 114 of the first USB interface, e.g. by means of the continuous ECI communication.

Figure 5:
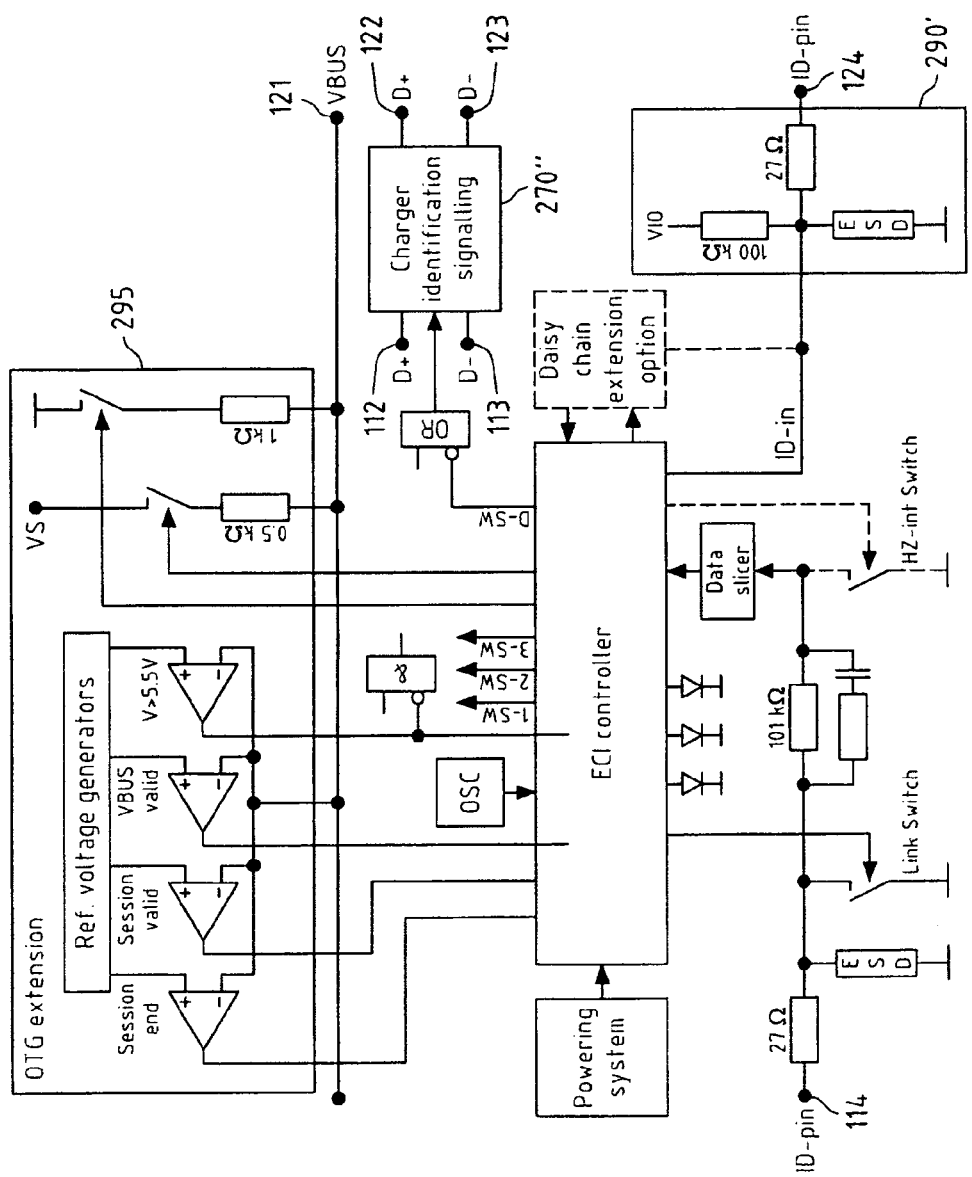
FIG. 5: a block diagram of exemplary control link and exemplary control stages of an apparatus according to the present invention.

The apparatus 200 may further optionally comprise an optional OTG device 295 which is connected to the VBUS 121 of the second interface, wherein this OTG device 295 represents a leakage switch circuit which is configured to be switched into a state for compensating for the VBUS load according the VBUS load range of the USB OTG standard. An exemplary embodiment of this OTG device 295 is depicted in FIG. 5 ("OTG extension").

Figure 4:
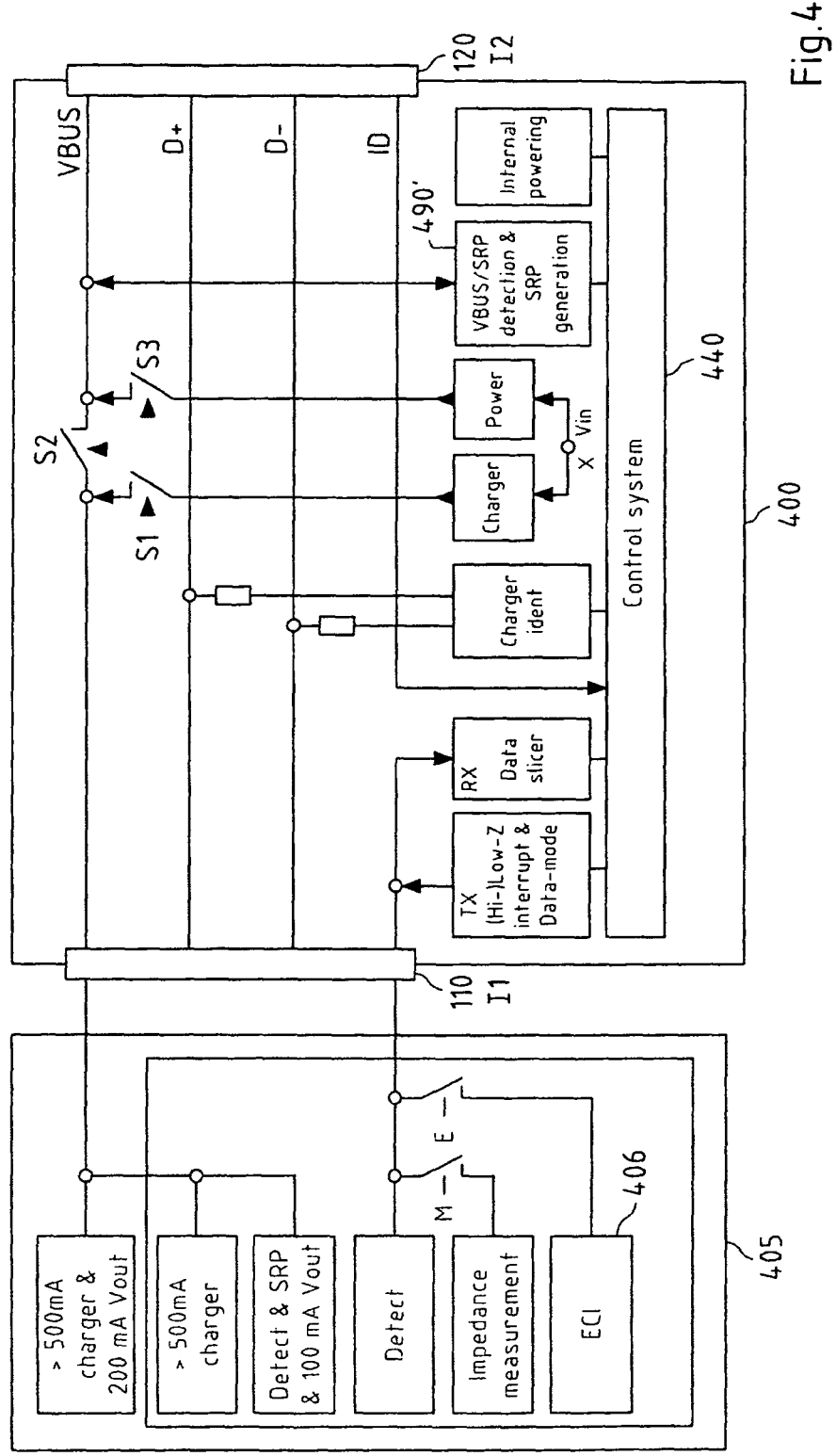
FIG. 4: a block diagram of an exemplary embodiment of a system according to an embodiment of the present invention.

FIG. 4 depicts a further schematic embodiment of an apparatus 400 according to the present invention, which may be applied instead of the apparatuses explained before. Please note, that the GND pins 115, 125 of the two interfaces 110, 120 are not shown in FIG. 4.

The apparatus 400 is similar to the apparatus 200 depicted in FIG. 2, wherein the communication unit 280 may be realized by the TX and RX components in order to communicate via the ID pin of the first interface to a compatible USB unit 405 which is connected to the first interface 110. For instance, said USB unit 405 may represent a mobile phone, e.g. a USB host phone. Said TX and RX components and the ECI component 406 in the USB unit 405 may be compatible with the Enhance Control Interface (ECI) link specified by Nokia.

The ECI-link needs proper mechanism to start communication with the ID-line in a specification compliant way. For that purpose a Hi-Z interrupt signal is needed and also special detection circuitry that will be available, as integrated as mixed signal IC in the USB unit 405, otherwise integration to other ICs or discrete solutions may be used.

When the USB unit 405 detects an ID-low state, it will also initiate the specific data mode without interrupt from the apparatus 400. The data mode is showing low impedance and is set by LZ-mode switch in FIG. 6. The apparatus will automatically resume the Hi-Z mode in addition of USB unit 405 control. The automatically forced switching is necessary to maintain compliance in all plugging and un-plugging cases. USB units 405 which have also other functionalities to ECI, as Digital Battery Interface (DBI) and signature connector, need a mode switch.

The ECI interface communication and configuration may be initiated also by the USB unit 405. In this case the VBUS voltage appearance is needed to start the communication trial and the USB unit 405 needs to set the low-impedance mode as the communication impedance needs to be about 1 . . . 2 kΩ. If there is no response it can be decided that the connected system does not include ECI, and the communication mode can be aborted. The communications may expect that the apparatus 400 is powered from the connector, e.g. connector 250 depicted in FIG. 2. This approach avoids Hi-Z detection in the USB unit 405 while this route might detect all apparatus based interrupts. The ECI-link may be daisy-chained, as depicted in FIG. 5, but it creates additional complexity to HW and SW.

FIG. 5 depicts a block diagram of an exemplary control link and exemplary control stages of an apparatus according to the present invention, wherein said apparatus may be any of the apparatuses mentioned above. This control link comprises a detection of the ID-pin 124 status of the second interface via detection unit 290'. For instance, said detection unit 290' may be part of the detection unit 290 depicted in FIG. 2. For instance, the detection of the ID-pin 124 status may be used to detect whether an A-Device or a B-Device is connected to the second interface 120. Furthermore, if the second USB unit connected to the second interface 124 is removed, then the comparator may trigger and may give signal to the controller that may reset the apparatus 200, 400.

Figure 6:
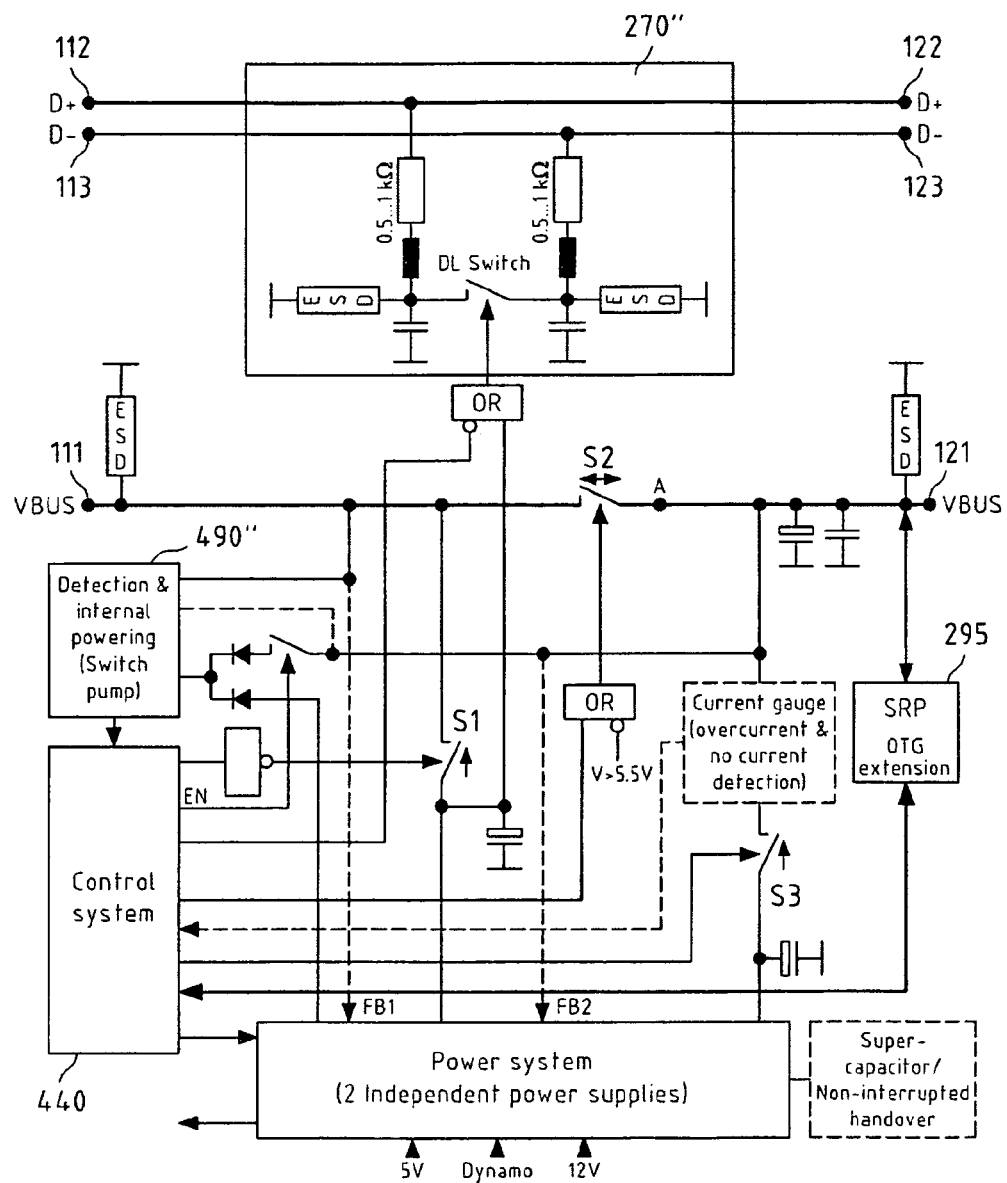
FIG. 6: a block diagram of exemplary switch arrangements of an apparatus according to the present invention.

FIG. 6 depicts a block diagram of exemplary switch arrangements of an apparatus according to the present invention, which comprises the three switches S1, S2, S3 associated with the first switching unit, and which comprises an embodiment of the second switching unit 270". Two different switch arrangements cases are presented in FIG. 6. Default safety control HW is presented with logic gates. The control system may reset on power-on, so that all control lines are low.

Electrostatic discharge (ESD) protection is connected to both connectors VBUS 111, 121 and ID pins 114, 124 (see FIG. 5).

Furthermore, when power is taken from battery while an application is running on a USB unit, and the apparatus 100, 200, 400 is connected but not powered by the charger, then switching creates interruption in the power delivery. If charging is now needed the switch-over will terminate a running application that may create a problem for the user. In this case a handover system may be arranged in the apparatus 100, 200, 400 that needs special control performance from the charger. Apparatus and VBUS handover may be controlled by a voltage control loop arrangement to a regulator of the apparatus so that during handover there will not take place any voltage transient. The handover may be done in both directions until power is on. The handover switch control latency is in the range of tens of milliseconds via ECI communication system, e.g. depicted in FIG. 6. This handover system may be optional.

Figure 7:
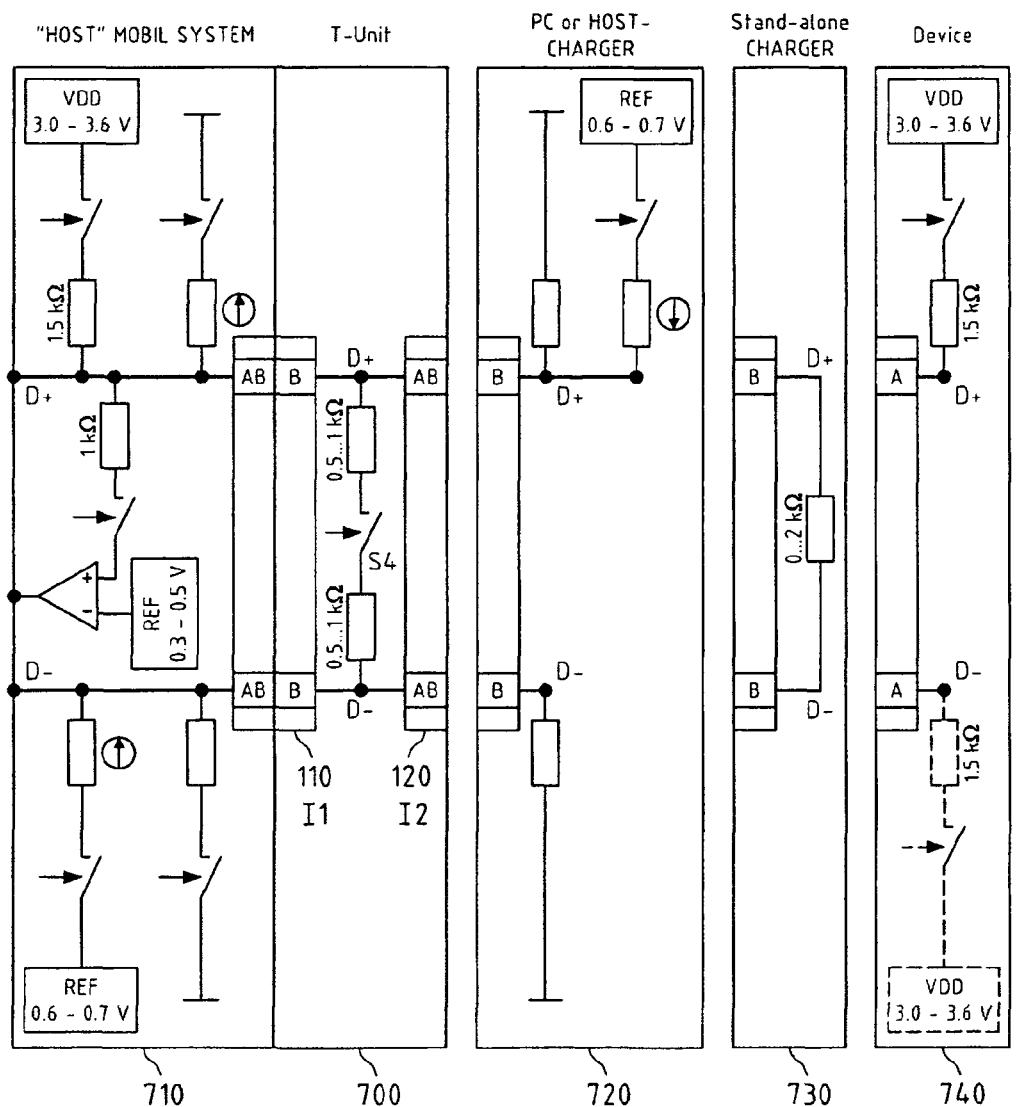
FIG. 7: a block diagram of a further exemplary embodiment of a system according to an embodiment of the present invention.

FIG. 7 depicts a block diagram of a further exemplary embodiment of a system according to an embodiment of the present invention, wherein only the data lines D+ and D− of the USB interfaces 110, 120 are shown. The first interface 110 may represent a B-plug, and the second interface 120 may represent a AB-receptacle. USB unit 720 represents a PC or Host-Charger, USB unit 730 represents a stand-alone charger and USB unit 74 represents a B-Device, each suited to be connected to the second interface 120 of an apparatus 700 according to the present invention. USB unit 710 represents a "Host" Mobile System. Said apparatus may be any apparatus mentioned-above.

Figure 8:
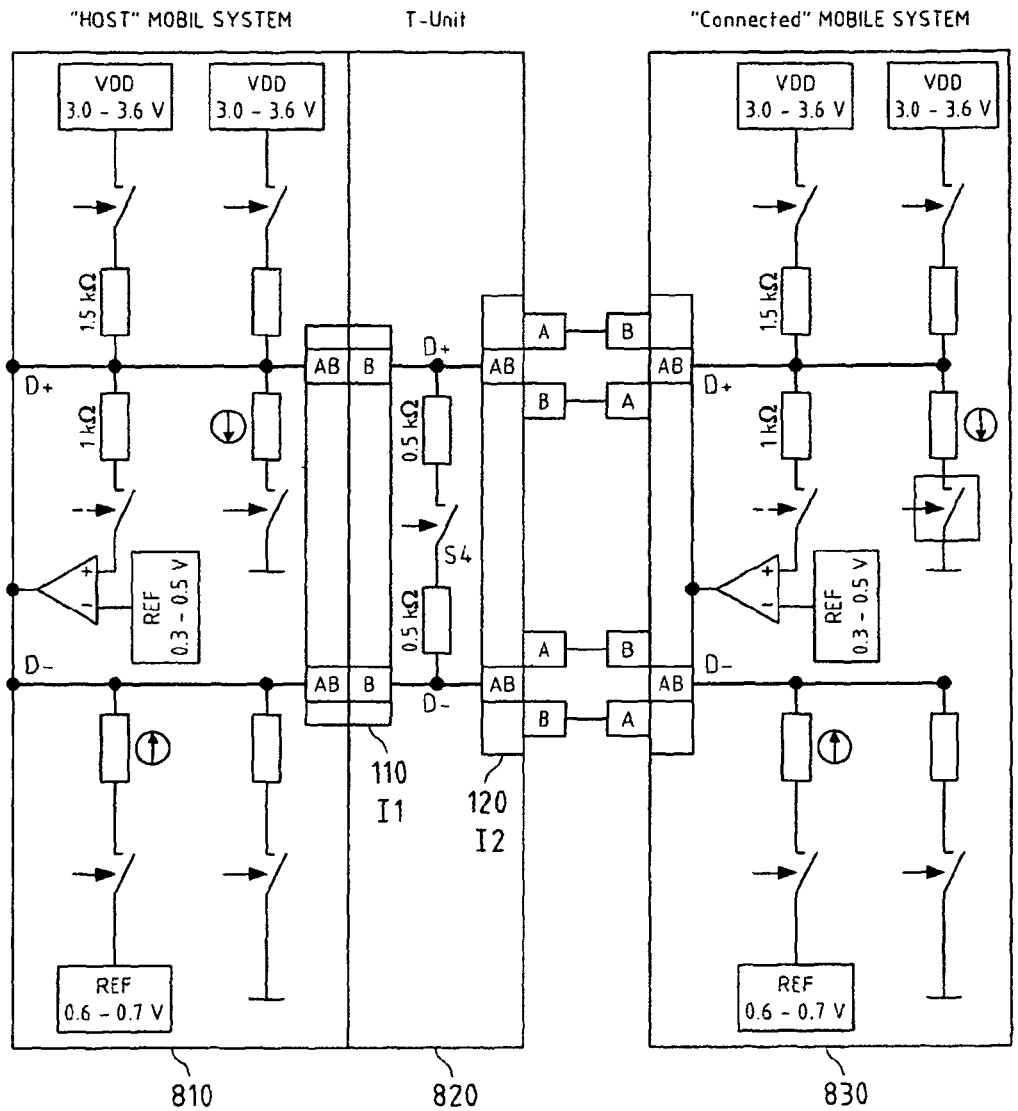
FIG. 8: a block diagram of a further exemplary embodiment of a system according to an embodiment of the present invention.

Furthermore, for instance, the apparatus 100, 200, 400 may be transparent to an external charger identification system, wherein D+ and D− roles may be for instance swapped. FIG. 8 depicts a block diagram of a further exemplary embodiment of a system according to an embodiment of the present invention. The apparatus 820 corresponds to the apparatus 700 depicted in FIG. 8, and the "Host" Mobile System 810 corresponds to the USB unit 710 depicted in FIG. 8. Another Mobile System, indicated as "Connected" Mobile System 830 which comprises an AB-connector may be connected by an AB-cable or BA-cable, alternatively, to the second interface 120, wherein in the first case the "Connected" Mobile System take the initial role of a B-Device and in the second case the initial role of an A-Device.

Figure 10:
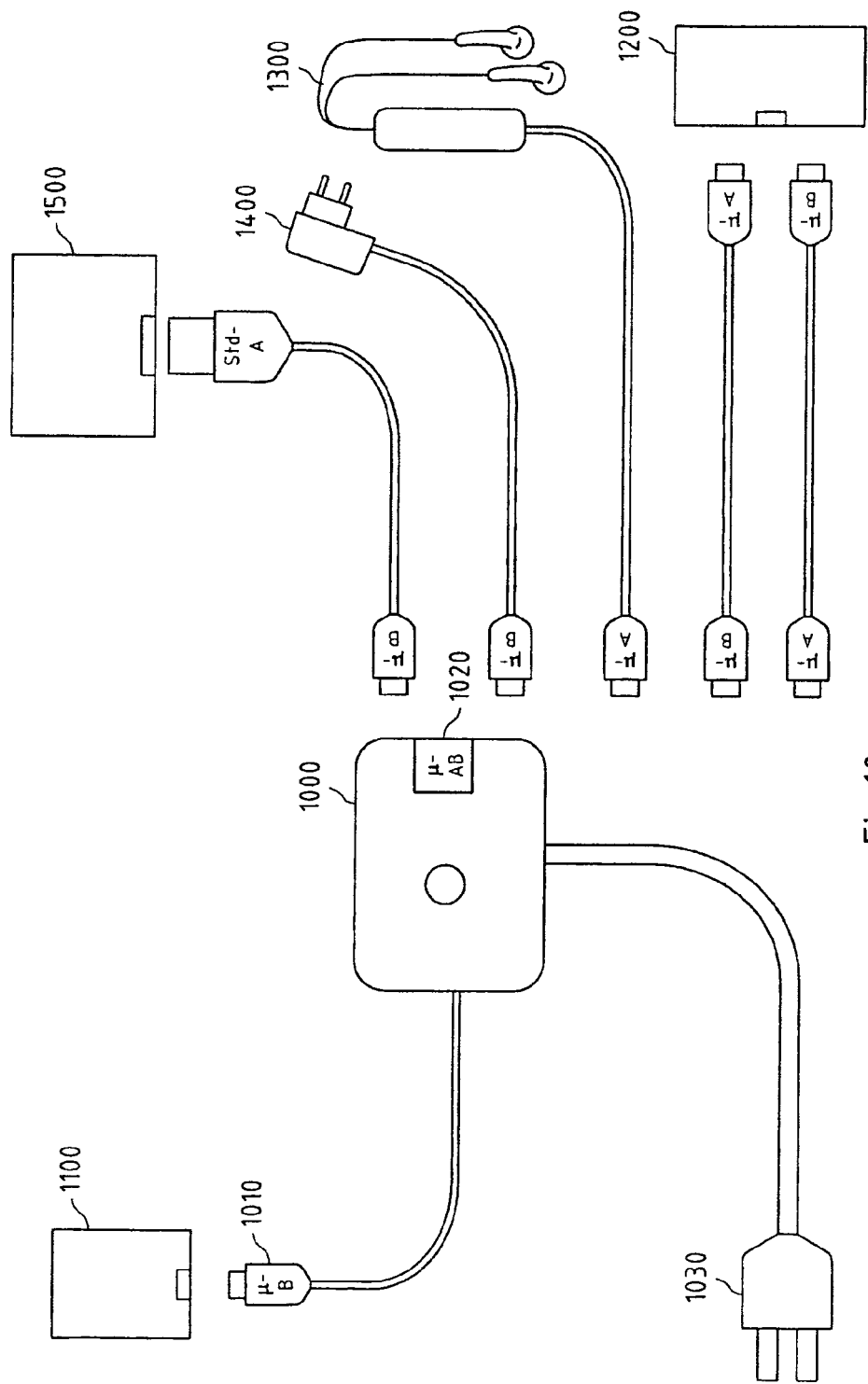
FIG. 10: a block diagram of a further exemplary embodiment of a system according to an embodiment of the present invention.

FIG. 10 depicts a block diagram of a further exemplary embodiment of a system according to an embodiment of the present invention, wherein the exemplary embodiment of the apparatus 1000 may comprise a USB Micro AB-receptacle connected to the second interface 120, and a 5-wire cable terminated with a Micro-B plug 1010, said 5-wire cable being connected to the first interface 110. The apparatus 1000 may further optional comprise a dual-charge button. The apparatus may be powered from a mains supply 1030, e.g. connected to the first power supply. For instance, said apparatus 1000 may comprise a long power lead to the mains supply/connector 1030, so that the apparatus may be placed far away from the mains supply 1030. The design of the apparatus 1000 may be so that the USB connections to the apparatus 1000 can be physically separated by some distance from the mains socket. Peripherals may be connected to the apparatus by the Micro-AB receptacle 1020. This will take either a Micro-A or Micro-B plug which, according to the USB OTG rules, also determines the initial role of the first USB unit 1100. Examples of the types of devices which could be connected are shown in FIG. 10: laptop/PC 1500, USB charger 1400, USB headphones 1300, or another USB unit 1200 like a terminal or mobile phone etc. connected in either configuration.

Furthermore, any of the apparatuses 1, 100, 200, 400, 1000 mentioned above may comprise a plug 1010 connected to first USB interface 110, wherein this plug 1010 may be one out of a Standard B-Plug, Mini-B Plug, Micro B-Plug, Captive (i.e. proprietary) or hard-wired captive (i.e. non-removeable), and any of the apparatuses 100, 200, 400, 1000 may comprise a receptacle 1020 connected to the second USB interface 120, wherein this receptacle 1020 is one out of Mini-AB, Micro-AB or combination of Standard A/Mini-A plus one of a B-side connector.

The invention has been described above by means of exemplary embodiments. It should be noted that there are alternative ways and variations which are obvious to a skilled person in the art and can be implemented without deviating from the scope and spirit of the appended claims.

The invention claimed is:

1. An apparatus, comprising:
a first and a second serial interface, each comprising at least one data line and a power supply line;
a first switching unit coupled to the power supply lines of said first serial interface and said second serial interface, the first switching unit comprising a first switch placed between the power supply line of the first serial interface and the power supply line of the second serial interface, wherein in a first state said first switching unit closes the first switch such that the power supply line of said first serial interface is connected to the power supply line of said second serial interface via the closed first switch;
a controller configured to control said first switching unit, wherein the first switching unit comprises a second switch placed between the power supply line of the first serial interface and a first further power supply line, and wherein in a second state said first switching unit closes the second switch such that the power supply line of said first serial interface is connected to the first further power supply line via the closed second switch, said first further power supply line being configured to be connected to a first power supply; and wherein said apparatus comprises a charger identification unit configured to detect a charger connected to the second serial interface, and wherein said controller switches said first switching unit into the first state in response to the charger identification unit detecting a charger at the second serial interface.

2. The apparatus according to claim 1, wherein said first and second serial interfaces are universal serial bus interfaces.

3. The apparatus according to claim 1, wherein said apparatus comprises an interface for connecting the first further power supply line to the first power supply.

4. The apparatus according to claim 1, wherein said apparatus comprises a charger identification unit configured to detect a charger connected to the second serial interface, and wherein said controller switches said first switching unit into the first state if a charger is detected at the second serial interface.

5. The apparatus according to claim 1, wherein said apparatus comprises a second switching unit coupled to at least one data line of said at least one data line of said first serial interface and coupled to at least one data line of said at least one data line of the second serial interface, respectively, and wherein in a first operation state said second switching unit connects said at least one data line of said at least one data line of said first serial interface to the corresponding at least one data line of said at least one data line of said second serial interface, respectively, and wherein in a second operation state said second switching unit disables data passthrough from the first to the second serial interface.

6. The apparatus according to claim 5, wherein said first and second serial interfaces are universal serial bus interfaces, and wherein said power supply lines of said first and second universal serial bus interfaces represent VBUS power supply lines, wherein said second switching unit is coupled to the D+ and D− pins of the first and second universal serial bus interfaces, respectively, and wherein in said first operation state said second switching unit connects the D+ pins of the first and second universal serial bus interfaces to each other and connects the D− pins of the first and second universal serial bus interfaces to each other.

7. The apparatus according to claim 6, wherein in a first sub-state of said second state said second switching unit shorts the D+ and D− pins of the first universal serial bus interface together in order to indicate a charger, and wherein said second switching unit is switched into said first sub-state if a charger is detected at the second universal serial bus interface.

8. The apparatus according to claim 6, wherein said apparatus is configured to communicate via an identification pin of the first universal serial bus interface.

9. The apparatus according to claim 8, wherein said communication via the identification pin is performed by a dual impedance enhancement control interface link interrupt.

10. The apparatus according to claim 6, wherein said apparatus is configured to be switched into a dual charge mode, wherein:
the first switching unit is switched into a first sub-state of the second state, wherein in said first sub-state the first switching unit connects the VBUS of the first universal serial bus interface to the first further power supply line and connects the VBUS of the second universal serial bus interface to a second further power supply line, and
wherein said second switching unit is switched into a second sub-state of the second state, wherein in said second sub-state said second switching unit shorts both the D+ and D− pins of the first universal serial bus interface and of the second universal serial bus interface together in order to indicate a charger.

11. A method comprising:
switching a first switching unit of an apparatus into a state out of a set of states, wherein said apparatus comprises a first serial interface and a second serial interface, each of said first and second serial interface comprising at least one data line and a power supply line, and wherein said first switching unit is coupled to the power supply line of both said first serial interface and said second serial interface, the first switching unit comprising a first switch placed between the power supply line of the first serial interface and the power supply line of the second serial interface; the first switching unit further comprising a second switch placed between the power supply line of the first serial interface and a first further power supply line;
wherein said set of states comprises:
a first state for closing the first switch such that the power supply line of said first serial interface is connected to the power supply line of said second serial interface via the first closed switch, and
a second state for closing the second switch such that the power supply line of said first serial interface is connected to the first further power supply line via the second closed switch, said first further power supply line being configured to be connected to a first power supply;
and wherein the method further comprises switching the first switching unit into the first state in response to detecting a charger at the second serial interface.

12. The method according to claim 11, the method comprising:
detecting a charger connected to the second serial interface, and
switching said first switching unit into the first state if a charger is detected at the second serial interface.

13. The method according to claim 11, wherein said apparatus comprises a second switching unit coupled to at least one data line of said at least one data line of said first serial interface and coupled to at least one data line of said at least one data line of said second serial interface, respectively, and wherein in a first operation state said second switching unit connects said at least one data line of said at least one data line of said first serial interface to the corresponding at least one data line of said at least one data line of said second serial interface, respectively, and wherein in a second operation state said second switching unit disables data passthrough from the first to the second serial interface.

14. A computer program comprising a non-transitory computer-readable medium which stores computer program code embodied therein for use with a computer, when executed by the processor, to perform the following: switching a first switching unit of an apparatus into a state out of a set of states;
wherein said apparatus comprises a first serial interface and a second serial interface, each of said first and second serial interface comprising at least one data line and a power supply line; and
wherein said first switching unit is coupled to the power supply line of both said first serial interface and said second serial interface, the first switching unit comprising a first switch placed between the power supply line of the first serial interface and the power supply line of the second serial interface; the first switching unit further comprising a second switch placed between the power supply line of the first serial interface and a first further power supply line;

wherein said set of states comprises
a first state for closing the first switch such that the power supply line of said first serial interface is connected to the power supply line of said second serial interface via the first closed switch; and
a second state for closing the second switch such that the power supply line of said first serial interface is connected to the first further power supply line via the second closed switch, said first further power supply line being configured to be connected to a first power supply; and
wherein the computer program code is further configured to perform switching of the first switching unit into the first state in response to detecting a charger at the second serial interface.

* * * * *